(12) United States Patent
Cernik

(10) Patent No.: US 8,328,496 B2
(45) Date of Patent: Dec. 11, 2012

(54) SILO UNLOADER

(76) Inventor: Bernard Cernik, Clymer, PA (US)

( * ) Notice: Subject to any disclaimer, the term of this patent is extended or adjusted under 35 U.S.C. 154(b) by 1082 days.

(21) Appl. No.: 11/763,165

(22) Filed: Jun. 14, 2007

(65) Prior Publication Data

US 2007/0292246 A1 Dec. 20, 2007

Related U.S. Application Data

(60) Provisional application No. 60/813,562, filed on Jun. 14, 2006.

(51) Int. Cl.
B65G 1/00 (2006.01)
(52) U.S. Cl. ........ 414/306; 414/308; 414/318; 414/325; 414/327
(58) Field of Classification Search .................. 414/306, 414/308, 318, 325, 327
See application file for complete search history.

(56) References Cited

U.S. PATENT DOCUMENTS

| | | | |
|---|---|---|---|
| 2,635,770 A | 4/1953 | Tiedemann | |
| 2,711,834 A | 6/1955 | Broberg et al. | |
| 2,718,970 A | 9/1955 | Dueringer | |
| 2,955,719 A | 10/1960 | Hilderbrand | |
| 4,076,133 A * | 2/1978 | Weaver | 414/311 |
| 4,671,727 A | 6/1987 | Hlinka et al. | |
| 2008/0304945 A1 * | 12/2008 | Hlinka | 414/307 |

OTHER PUBLICATIONS

Engineered Storage Products Company, advertisement for Harvestore XL Unloader, 2007.

* cited by examiner

*Primary Examiner* — Saul Rodriguez
*Assistant Examiner* — Willie Berry, Jr.
(74) *Attorney, Agent, or Firm* — Alan G. Towner, Esq.; Pietragallo Gordon Alfano Bosick & Raspanti, LLP

(57) ABSTRACT

A bottom unloader for conveying feed material from a silo is disclosed. The unloader may have a housing with a drive unit and discharge, a conveyor positioned in the trough of a silo and a rotating cutter arm. The bottom unloader may be equipped with heavy-duty hooks having a wide uniform forward profile to prevent breaking and clogging of the conveyor. The hooks may be arranged in a repeating sequence to optimize unloading. The silo trough may have a wide chamfered section to prevent bridging. A discharge cover may extend from the conveyor to cover the top of the trough within the silo. The discharge cover remains fixed to conveyor backbone and is removed from the silo with conveyor.

18 Claims, 6 Drawing Sheets

SILO UNLOADER

CROSS-REFERENCE TO RELATED APPLICATION

This application claims the benefit of U.S. Provisional Patent Application Ser. No. 60/813,562 filed Jun. 14, 2006, which is incorporated herein by reference.

FIELD OF THE INVENTION

The present invention relates to silo unloaders, and more particularly relates to bottom unloaders with improved performance and efficiency.

BACKGROUND INFORMATION

Conventionally, silage and other feed materials are stored in structures such as silos. The feed material is often removed from the structure by way of a bottom unloader. A conventional bottom unloader is described in U.S. Pat. No. 2,635,770 to Tiedemann, which is herein incorporated by reference.

Conventional bottom unloaders suffer from several disadvantages, including chain clogging which requires starting and stopping the unloader in forward and reverse directions to free the chain. This process often leads to breaking the chain, requiring removal of the unloader and repair of the chain. Other disadvantages of conventional bottom unloaders include low feed rates, inability to convey hailage at moisture levels above 50%, high maintenance costs and high utility costs. Furthermore, the unreliability of the bottom unloaders requires an operator to stay with the machine during unloading to prevent clogging.

The present invention has been developed in view of the foregoing.

SUMMARY OF THE INVENTION

The present invention provides a bottom unloader for conveying feed material from a silo. The unloader may have a housing with a drive unit and discharge, a conveyor positioned in the trough of a silo and a rotating cutter arm. The bottom unloader may be equipped with heavy-duty hooks having a wide uniform forward profile to prevent breaking and clogging of the conveyor. The hooks may be arranged in a repeating sequence to optimize unloading. The silo trough may have a wide chamfered section to prevent bridging. A discharge cover may extend from the conveyor to cover the top of the trough within the silo. The discharge cover remains fixed to the conveyor backbone and is removed from the silo with conveyor.

An aspect of the present invention provides a chain for a cutter or conveyor arm of a silo bottom unloader comprising an endless chain and hooks mounted on and extending generally laterally from the cutter chain, wherein each hook has a forward profile in which the base of the cutter hook has a width that is substantially equal to or greater than the remainder of the cutter hook.

Another aspect of the present invention provides a bottom unloading system for a silo comprising a housing for a drive unit and discharge outlet, a conveyor attached at its proximal end to the housing having an endless conveyor chain structured to rotate longitudinally about the conveyor, conveyor hooks mounted on and extending radially from the conveyor chain, a cutter arm rotatably mounted on a distal end of the conveyor having an endless cutter chain structured to rotate longitudinally about the cutter arm; and cutter hooks extending generally laterally from the cutter chain, wherein each cutter hook has a forward profile in which the base of the cutter hook has a width that is substantially equal to or greater than the remainder of the cutter hook.

A further aspect of the present invention provides a bottom unloading system for a silo comprising a housing for a drive unit and discharge outlet, backbone extending from the housing, a discharge cover attached to and extending from the housing, a conveyor supported by the backbone and attached to the housing, a cutter arm rotatably mounted on a distal end of the conveyor.

Yet another aspect of the present invention provides a cutter hook for a cutter arm chain of a silo bottom unloader, the cutter hook comprising a proximal leg and a distal hook portion, wherein the leg has a width measured from a forward profile of the cutter hook, the hooked portion has a width measured from the forward profile, and the width of the leg is greater than or substantially equal to the width of the hooked portion.

These and other aspects will become more apparent from the following description.

DETAILED DESCRIPTION

Figure 1:
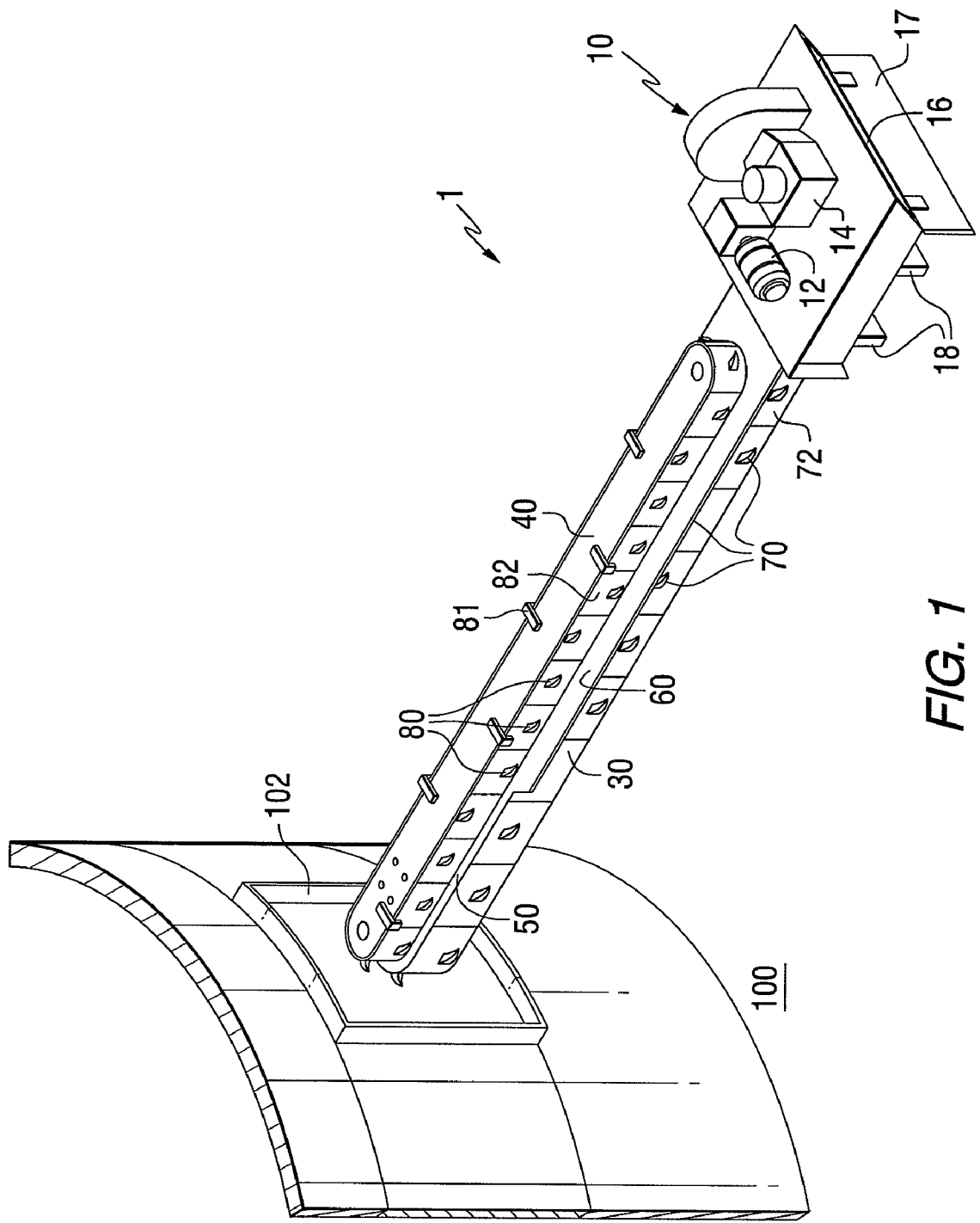
FIG. 1 is an isometric view of a silo bottom unloader prior to being installed in the silo according to one embodiment of the present invention.

Referring to FIG. 1, a silo bottom unloader 1 is shown according to one embodiment of the present invention. The bottom unloader 1 has a housing 10 which holds a drive unit including a motor 12 and transmission 14. Other parts of the housing 10 include mounting brackets 18 and a discharge outlet 16. The discharge outlet 16 may have a hinged door 17 for opening and closing the outlet 16. As used herein the housing 10 is the portion of the unloader 1 that holds the drive components and discharge assembly and which remains outside the silo 100 at all times. Extending from the housing 10 is a conveyor arm 30. About the periphery of the conveyor arm 30 is an endless conveyor chain 72 comprising several conventional chain links. The motor 12 and transmission 14 couple to and power the chain 72 of the conveyor arm 30 within the housing 10. Mounted on the conveyor chain 72 are laterally or horizontally extending conveyor hooks 70. In one embodiment, none of the conveyor cutter hooks 70 extend from the conveyor chain 72 with a vertical component, e.g., all of the conveyor hooks 70 extend substantially horizontally. Rotatably mounted to a distal end of the conveyor arm 30 is a cutter arm 40. Mounted about the periphery of the cutter arm 40 is an endless cutter chain 82 comprising several conventional chain links. Laterally or horizontally extending from the cutter chain 82 are cutter hooks 80. In one embodiment, none of the cutter hooks 80 extend from the cutter chain 82 with a vertical component, e.g., all of the cutter hooks 70 extend substantially horizontally. The supporting structure of the conveyor arm 30 and cutter arm 40 is a frame often referred to as a backbone 50. From the folded position shown in FIG. 1, the cutter arm 40 and conveyor arm 30 are inserted through an access door 102 of a silo 100. A discharge cover 60 extends outwardly from a proximal portion of the backbone 50. This discharge cover 60 rests on runners incorporated in a trough inside the silo and serves to enclose the top of the trough (not shown in FIG. 1) inside of the silo 100. The discharge cover 60 is dimensioned to span the width of the trough, which is most commonly 24 inches or 30 inches.

Figure 2:
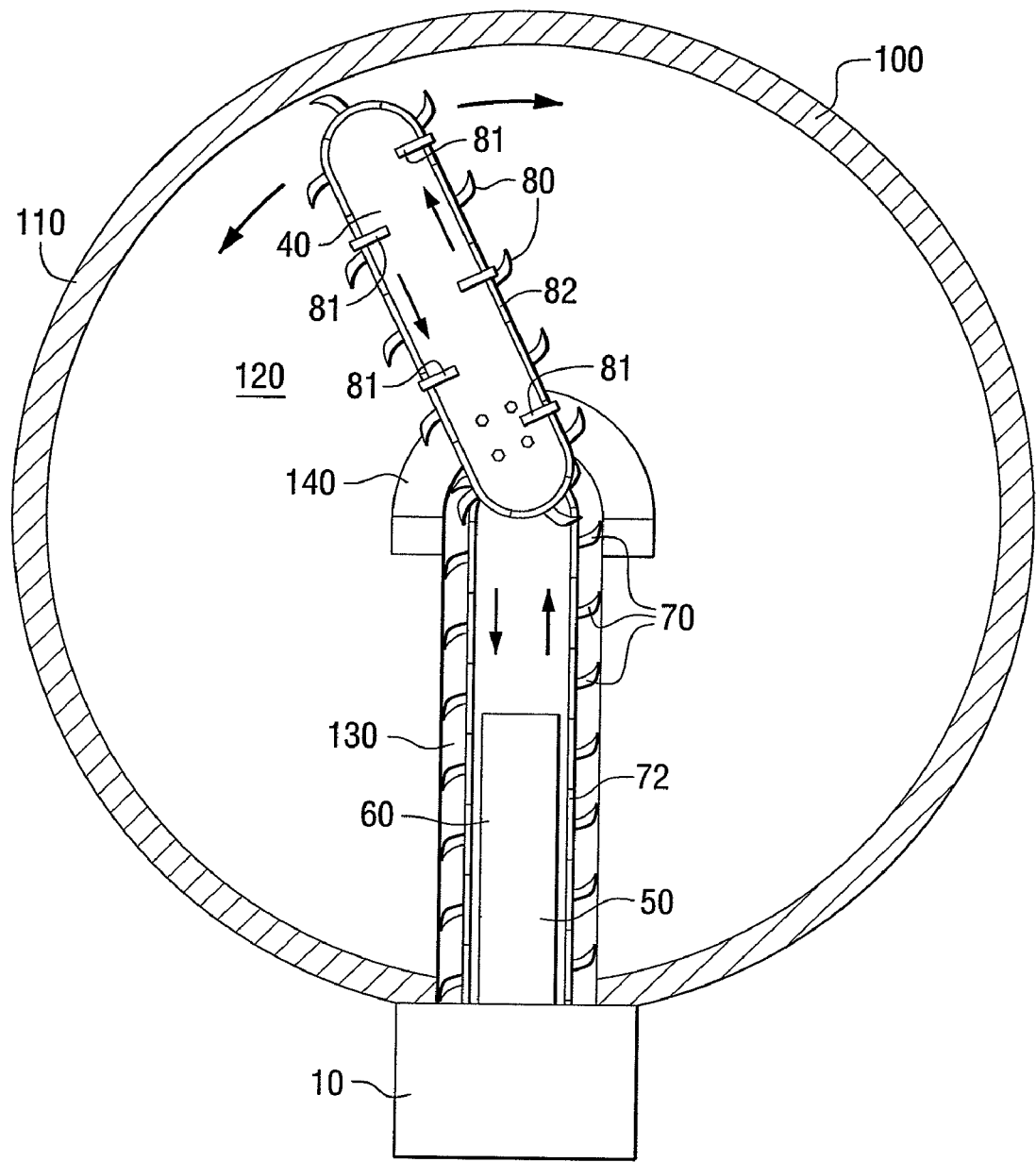
FIG. 2 is a top cross-sectional view of a silo with a bottom unloader installed therein according to one embodiment of the present invention. The silo is shown as empty for illustrative purposes.

Referring to FIG. 2, the silo bottom unloader of FIG. 1 is shown inserted in the bottom of the silo 100. Arrows in FIG. 2 indicate directional movement of the chains 72, 82 and cutter arm 40. While it is possible to rotate the cutter arm 40 and chains 72, 82 in either direction through controls on the housing 10, the orientation of the cutter hooks 80 makes counterclockwise rotation in this configuration preferred. As can be seen, the conveyor arm 50 sits within a trough 130 and the discharge cover 60, which is part of or attached to the backbone 50, rests on runners 150 (shown in FIGS. 8-9) within the trough 130. This permits 360-degree rotation of cutter arm 40 over a relatively flat surface inside the silo. Attaching the discharge cover 60 to the backbone 50 facilitates easy removal of the bottom unloader 1 from the silo especially if jamming occurs. Wiper blades 81 are preferably installed on the cutter chain 82. The wiper blades 81 are directed upwardly and inwardly from the cutter chain 82 and prevent silage from accumulating on the top of the cutter arm 40. Excess silage on top of the cutter arm 40 may cause the chain to bind or break, stalling the unloading process. The trough 130 terminates at the center of the silo floor 120 with a chamfered section 140. The chamfered section 140 funnels feed material pulled inwardly by the cutter hooks 80 to the conveyor hooks 70 rotating in a lower elevation. The conveyor hooks 70 exit the silo 100, pulling the silage through the trough 130 and under the discharge cover 60 to the discharge outlet 16 of the housing 10.

Figure 3:
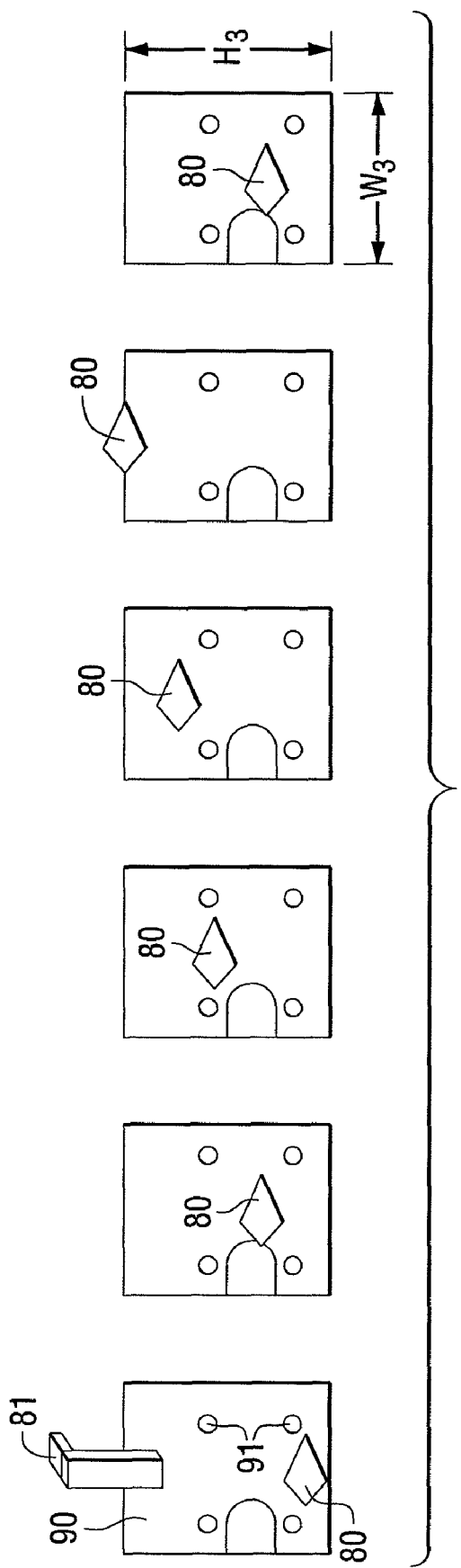
FIG. 3 is a partially schematic side view of a series of adjacent cutter chain plates having cutter hooks mounted thereon at different vertical positions according to one embodiment of the present invention.

Referring to FIG. 3, an arrangement of the cutter hooks 80 positioned on adjacent links of the cutter arm 40 are shown. The cutter hooks 80 are positioned at elevations increasing in elevation from left to right. Left to right is also the direction of travel when viewing FIGS. 3 and 4. The first position has a hook at a lower most elevation. For purposes of this description the leftmost position is the first position, but it should be understood that when the chain is motion this is also the trailing position. In the embodiment shown in FIG. 3, the cutter hooks 70 on successive links increase slightly until reaching a maximum elevation at the fifth position shown. The cutter hook 70 located in the sixth position is set at an elevation less than that of the cutter hook 70 in the fifth position. FIG. 3 shows a preferred configuration; however, the elevation of the cutter hook 70 in the sixth position may be changed to vary the aggressiveness of the cutter chain with increased elevations of the cutter hook 70 in position six resulting in a less aggressive chain and lower elevations resulting in a more aggressive chain. The cutter hooks 70 are welded or otherwise mounted on cutter plates 90, which attach by fastening means such as standard bolts to the links of the cutter chain 82. The fasteners (not shown) pass through bolt holes 91 located in the cutter plates 90. The cutter blades may have a width $W_3$ of about 2 to about 4 inches, for example, 3 inches. The cutter plates 90 may also have a height $H_3$ of about 4 to about 8 inches, for example, 6 inches. The direction of $H_3$ also corresponds to elevation as the term is used herein.

Figure 4:
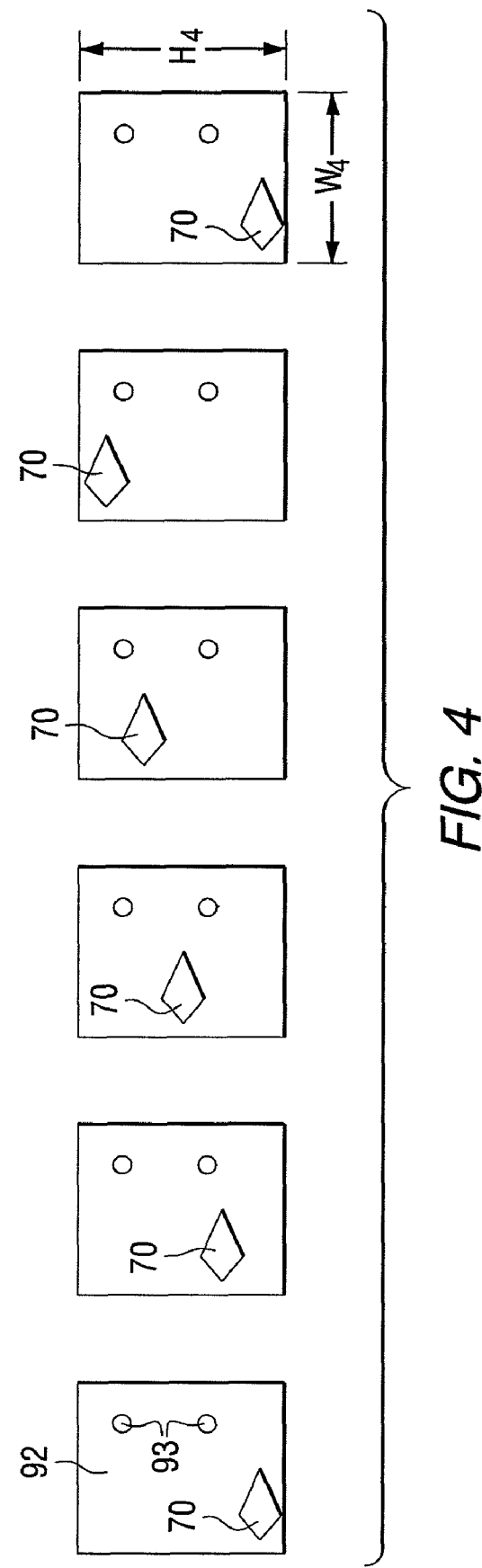
FIG. 4 is a partially schematic side view of a series of adjacent conveyor chain plates having cutter hooks mounted thereon at different vertical positions according to one embodiment of the present invention.

Referring to FIG. 4, an arrangement of conveyor hooks 70 on a series of conveyor plates 92 is shown. As with the cutter hooks 80, the conveyor hooks 70 increase in elevation from link to link starting with a first link having a lowest elevation and increasing to a fifth link having a highest elevation. Since the conveyor is a different application, the need for adjusting the sixth position conveyor hook, as may be done with the sixth position of the cutter hooks, may not be necessary. The conveyor hooks 70 are welded or otherwise mounted on the conveyor plates 92, which are fastened to the links of the conveyor chain 72 using standard bolts (not shown) through boltholes 93. The conveyor plates 92 may have a width $W_4$ of about 2 to about 4 inches, for example, 3 inches and a height, $H_4$, of about 4 to about 8 inches, for example, 5.5 inches. While the arrangements of hooks 70, 80 are described in sequences of five and six adjacent hooks, arrangements containing more or less hooks are possible, but in groups of no less than four. In a preferred embodiment, the conveyor hooks 70 and cutter hooks 80 extend outward from their respective chains in a horizontal or lateral direction, i.e., parallel to the silo floor.

Figure 5:
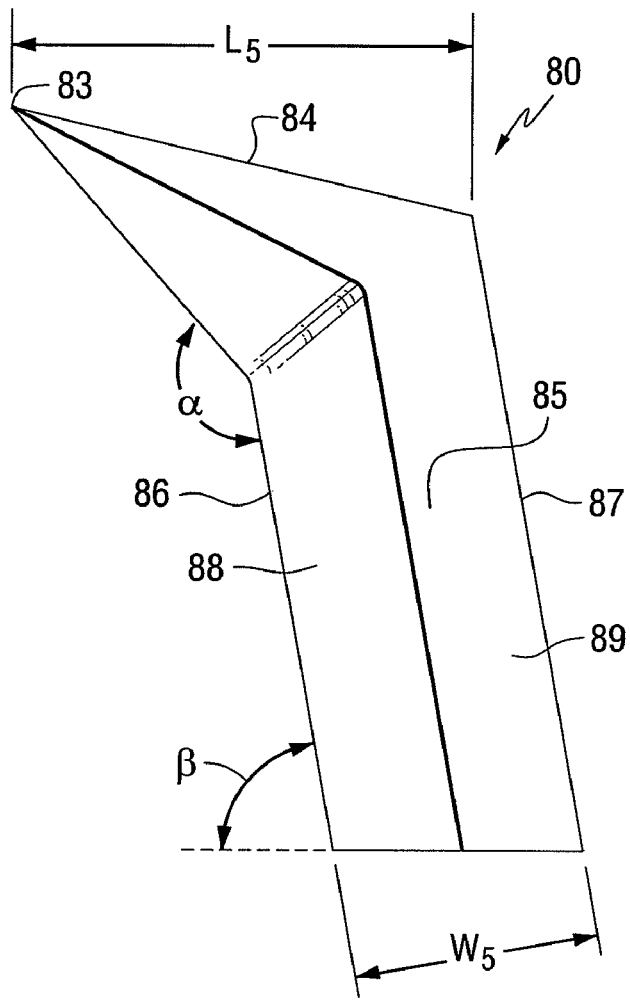
FIG. 5 is a top view of a cutter hook according to one embodiment of the present invention.

Referring to FIG. 5, a top view of a cutter hook 80 is shown. In one embodiment, the cutter hook 80 is made from steel square stock. The square stock is bent to an angle, represented by $\alpha$, of about 120 to about 145 degrees, for example 131 degrees. The bent stock is then cut to form a hooked portion 83 having a clearance face 84. The square stock is then cut at an angle, $\beta$ shown in FIG. 5, of about 60 to about 90 degrees, for example, 75 degrees, to provide a forward lean to the hook. The forward lean may also be produced by bending the leg 85 of the cutter hook 80. In the embodiment shown, the cutter hook 80 is made from 1 inch square stock, bent and cut to form an hooked portion 83 and clearance face 84, the leg 85 of the cutter hook 80 has a leading edge 86, a trailing edge 87, leading faces 88 and trailing faces 89. The leg has a width from leading edge 86 to trailing edge 87, $W_5$, which is largely dependent on the starting material from which the cutter hook is made. The width $W_5$ may be from about 1 inch to about 2 inches, for example, 1.4 inches. The cutter hook 80 may also have a length, $L_5$, as shown in FIG. 5, typically from about 2 inches to about 3.5 inches, for example, 2.75 inches.

Figure 6:
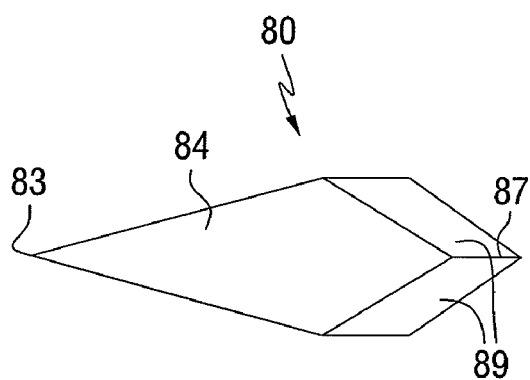
FIG. 6 is a side view of a cutter hook according to one embodiment of the present invention.
Figure 7:
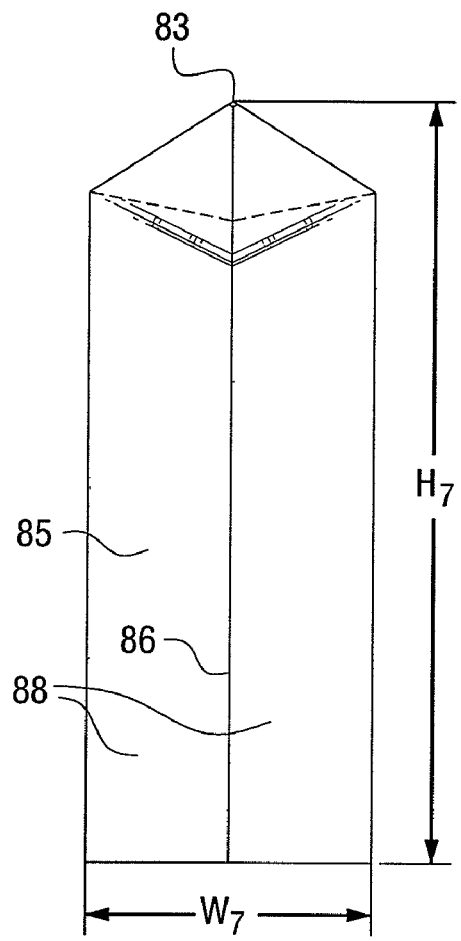
FIG. 7 is a front view of a cutter hook according to one embodiment of the present invention.

FIGS. 6 and 7 show side and front views of the cutter hook 80, respectively. FIG. 7 is a view of the forward profile or leading portion of the cutter hook 80. The cutter hook may have a width $W_7$ as seen in FIG. 7. Because square stock is preferred starting material for the hooks, the width $W_7$ is often, but not necessarily, equivalent to the width $W_5$ mentioned above in reference to FIG. 5. It should be noted that the width $W_7$ represents the widest portion of the cutter hook 80. There is no outwardly flared portion at the top of the cutter hook adjacent the clearance space 84 and no substantial narrowing along the length of the leg 85. This design having a stout base not only prevents the hooks from breaking, it resists the inclination of the hooks 80 to turn and twist. The hooks 80 may also have a height $H_7$ as shown in FIG. 7, typically from about 2.5 to about 5 inches, for example, 3.5 inches.

While FIGS. 5 through 7 show the transition from the leg 85 to a distal portion of the cutting hook 80 as an abrupt transition represented by angle α, cutter hooks having a radius transition are also effective. It should also be noted that while square stock has been used to show a preferred embodiment, round stock or other configurations of starting material may be used so long as the base of the cutting hook 80 when viewed from the front as in FIG. 7 is at or near the widest point of the cutting hook 80.

While the above detail regarding FIGS. 5-7 was made with reference to the cutter hooks 80, it should be understood that the configuration has proven to be effective for conveyor hooks 70 as well. Examples of suitable materials for the cutter hooks 80 and conveyor hooks 70 include steel, iron, stainless steel and titanium, and alloys of each. A preferred embodiment utilizes extruded steel square stock for the hooks 70 and 80.

Figure 8:
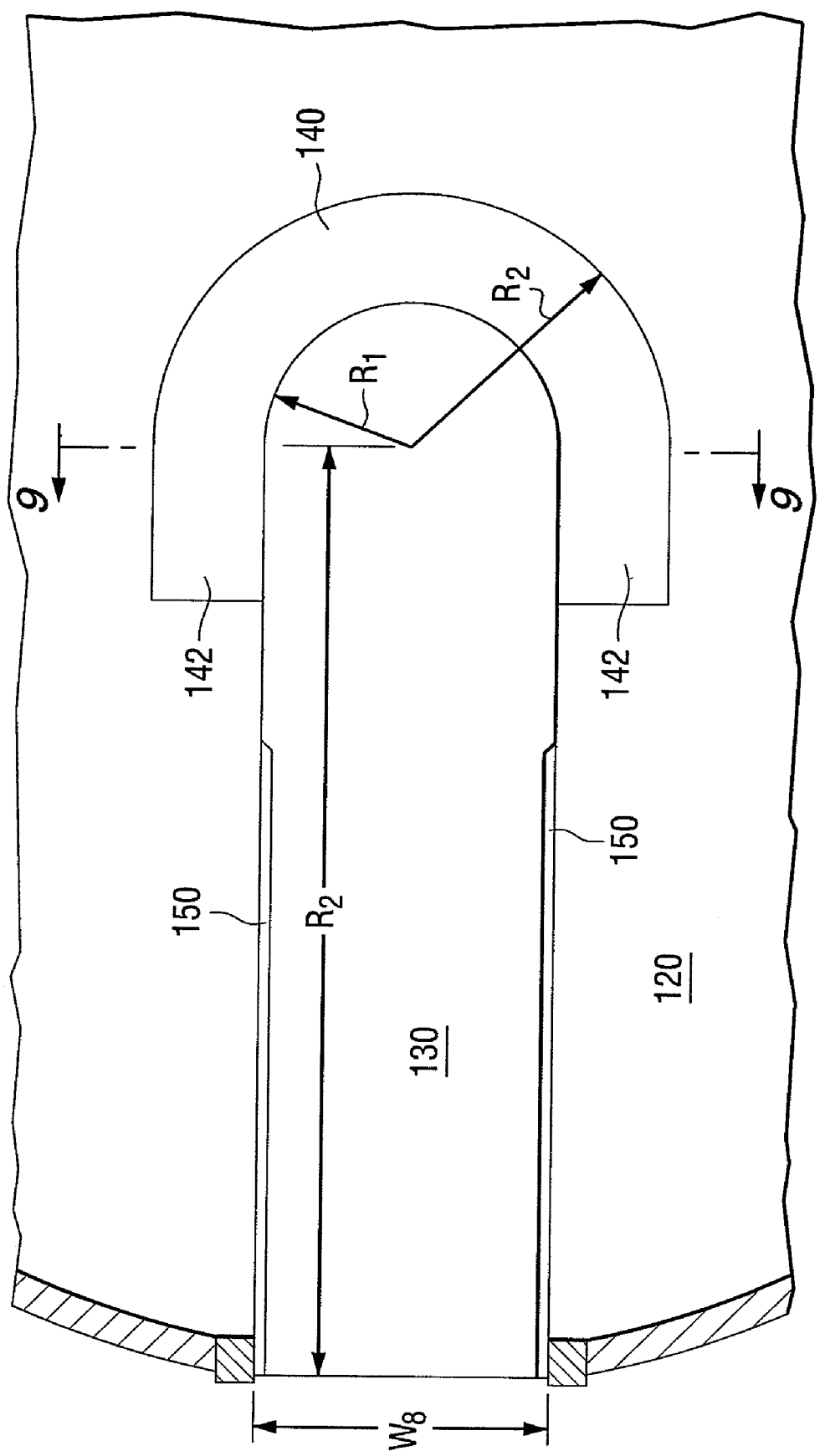
FIG. 8 illustrates the trough and tapered section recessed within the silo floor according to one embodiment of the present invention.

Referring to FIG. 8, the trough 130 is shown recessed in the silo floor 120. As mentioned above, the trough 130 extends from the access door 102 at the exterior of the silo to a central point of the silo floor 120. At the end of the trough 130 at the center of the silo 100 is a chamfered section 140, which is generally semi-circular and may have tapered extensions 142 providing a tapered u-shape about the bottom of the trough 130. This chamfered section 140 along with tapered extension 142 act to funnel silage discharged from the rotating cutter arm 40 to the conveyor arm 30 positioned within the trough 130. The chamfered section 140 may have a radius $R_1$ at its intersection with the bottom of the trough 130. $R_1$ may be about 14 to about 16 inches, for example, 15 inches. The chamfered section 140 may have a second radius $R_2$ at its intersection with silo floor 120. $R_2$ may be about 24 to about 26 inches, for example, 25 inches. A configuration with $R_2$ of 25 inches has shown to prevent bridging and loss material feed to the silo, a common problem with conventional unloaders. Also shown in FIG. 8 are runners 150, which support the discharge cover (not shown in FIG. 8). The runners may be for example 0.25"×1" steel extending from a sidewall of the trough 130.

Figure 9:
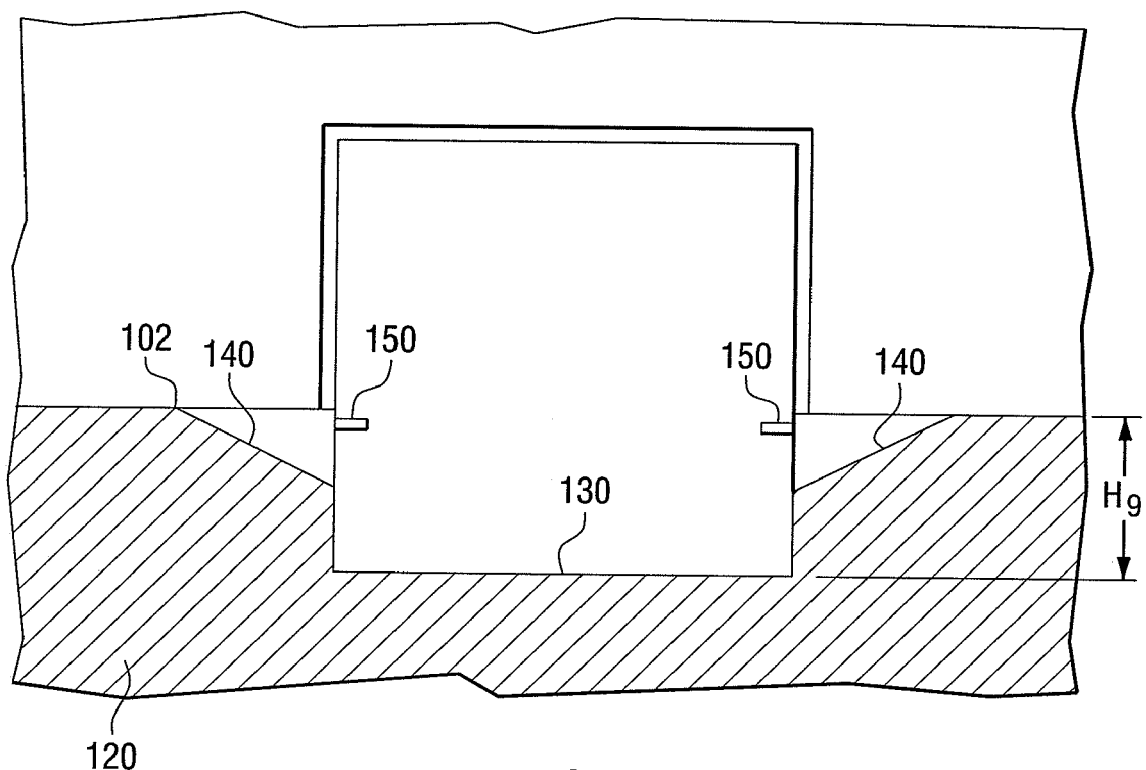
FIG. 9 illustrates a section view of the silo floor along line 9-9 of FIG. 8.

Referring now to FIG. 9, a sectional view of the trough 130 along line 9-9 of FIG. 8 is shown. FIG. 9 shows a height of the trough $H_9$. $H_9$ may be 5 to 10 inches, for example, 7⅜ inches. The height of the chamfered section 140 is variable. However, it may be 4⅜ inches according to one embodiment of the present invention. Runners 150 are shown slightly recessed from the top of silo floor 120 to allow room for discharge cover 60, thus providing a flush transition between the silo floor 120 and discharge cover 60. The width of the trough 130 is also variable and depends on the conveyor or unloader used. As mentioned above 24 inch and 30 inch troughs to accommodate similarly sized unloaders are the most common.

As mentioned above, chain clogging is problem with many conventional bottom unloaders. Clogging requires the unloader be removed from the silo in order to be cleaned out or jogging the cutter arm in reverse then forward. The latter option risks breaking the chain which causes significant downtime and maintenance. The unloader of the present invention has demonstrated improved reliability without sacrificing unloading capability easily feeding over 150 pounds per minute of 50-60% moisture silage without clogging or requiring any operator intervention. In contrast, a conventional unloader would often feed less than 10 pounds per minute at 60% moisture and would also require frequent operator attention. The silo bottom unloader described herein avoids the clogging associated with conventional unloaders, provides the ability to unload silage with relatively high moisture content compared to silage able to be unloaded by conventional unloaders, and significantly improves unloading efficiency. As a result, animal feed time is significantly reduced.

Whereas particular embodiments of this invention have been described above for purposes of illustration, it will be evident to those skilled in the art that numerous variations of the details of the present invention may be made without departing from the invention as defined in the appended claims.

The invention claimed is:

1. A chain for a cutter or conveyor arm of a silo bottom unloader comprising:
    an endless chain; and
    hooks mounted on and extending from the chain, wherein each hook has a forward profile in which a base of the hook adjacent to the chain has a width that is substantially equal to or greater than the remainder of the hook and each hook has a substantially square cross section at the base with a corner of the substantially square cross section forming a single leading edge of the base in a direction of travel of the chain.

2. The chain for a cutter or conveyor arm of a silo bottom unloader of claim 1, wherein at least a portion of the hooks extend substantially horizontally from the chain.

3. The chain for a cutter or conveyor arm of a silo bottom unloader of claim 2, wherein all of the hooks extend substantially horizontally from the chain.

4. The chain for a cutter or conveyor arm of a silo bottom unloader of claim 1, wherein the hooks are made from extruded steel.

5. The chain for a cutter or conveyor arm of a silo bottom unloader of claim 1, wherein the hooks are arranged in a repeating sequence whereby elevations of at least four adjacent hooks incrementally increase in elevation from a lowest hook elevation at a first position of the sequence to a maximum elevation at a last location of the sequence.

6. The chain for a cutter or conveyor arm of a silo bottom unloader of claim 5, wherein an additional hook is located between sequences at an elevation less that the maximum elevation.

7. The chain for a cutter or conveyor arm of a silo bottom unloader of claim 1, wherein the width of each hook is at least 1.25 inches.

8. The chain for a cutter or conveyor arm of a silo bottom unloader of claim 1, wherein the endless chain is a cutter chain for a cutter arm, and the hooks are cutter hooks.

9. The chain for a cutter or conveyor arm of a silo bottom unloader of claim 8, wherein the cutter hooks have a width of at least 1.25 inches.

10. A bottom unloading system for a silo comprising:
    a housing including a drive unit and discharge outlet;
    a conveyor attached at a proximal end to the housing having an endless conveyor chain structured to rotate longitudinally about the conveyor;
    conveyor hooks mounted on and extending radially from the conveyor chain;
    a cutter arm rotatably mounted on a distal end of the conveyor having an endless cutter chain structured to rotate longitudinally about the cutter arm; and
    cutter hooks extending generally laterally from the cutter chain, wherein each cutter hook has a forward profile in which the base of the cutter hook adjacent to the cutter chain has a width that is substantially equal to or greater than the remainder of the cutter hook and each cutter hook has a substantially square cross section at the base with a corner of the substantially square cross section forming a single leading edge of the base in a direction of travel of the chain.

11. The bottom unloading system for a silo of claim 10, wherein the cutter hooks have a width greater than 1 inch.

12. The bottom unloading system for a silo of claim 10, wherein the cutter hooks are arranged in a repeating pattern whereby elevations of at least four cutter hooks incrementally increase for adjacent cutter hooks from a lowest cutter hook elevation at a first location to a maximum elevation with the next cutter hook positioned at an elevation less that the maximum elevation.

13. The bottom unloading system for a silo of claim 10, further comprising a silo including a silo floor and silo wall, an access door through the silo wall, and a trough within the silo floor, wherein the conveyor further comprises a backbone extending the length of the conveyor including a discharge cover attached to the backbone, and the discharge cover is structured and arranged to cover a proximal portion of the trough.

14. The bottom unloading system for a silo of claim 13, wherein the chamfered portion is generally semi-circular.

15. The bottom unloading system for a silo of claim 10, further comprising a silo including a silo floor and silo wall, an access door through the silo wall, and a trough in the silo floor spanning from the access door to a chamfered portion near a central portion of the silo floor, the chamfered portion having an outer radius of at least about 24 inches.

16. The bottom unloading system for a silo of claim 15, further comprising tapered portions transitioning between the trough and the chamfered portion.

17. The bottom unloading system for a silo of claim 16, wherein the chamfered portion has an outer radius of about 24 inches to about 26 inches.

18. The bottom unloading system for a silo of claim 16, wherein the chamfered portion has an inner radius of about 14 inches to about 16 inches.

* * * * *